United States Patent
Bhattacharya

(10) Patent No.: US 9,275,232 B2
(45) Date of Patent: Mar. 1, 2016

(54) SYSTEMS AND METHODS FOR EVALUATING A SOURCE CODE SCANNER

(71) Applicant: Wipro Limited, Bangalore (IN)

(72) Inventor: Sourav Sam Bhattacharya, Fountain Hills, AZ (US)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/276,218

(22) Filed: May 13, 2014

(65) Prior Publication Data

US 2015/0332053 A1    Nov. 19, 2015

(51) Int. Cl.
*G06F 11/00*  (2006.01)
*G06F 21/57*  (2013.01)

(52) U.S. Cl.
CPC .................................. *G06F 21/577* (2013.01)

(58) Field of Classification Search
CPC ..................................................... H04L 63/145
USPC ................................ 713/188; 726/23, 24, 25
See application file for complete search history.

(56) References Cited

U.S. PATENT DOCUMENTS

| 7,685,271 B1* | 3/2010 | Schneider et al. | 709/224 |
| 2006/0274659 A1* | 12/2006 | Ouderkirk | 370/241 |
| 2009/0300765 A1* | 12/2009 | Moskovitch et al. | 726/24 |
| 2014/0090069 A1* | 3/2014 | Pistoia et al. | 726/25 |

FOREIGN PATENT DOCUMENTS

EP           2626668 A1    8/2013

* cited by examiner

*Primary Examiner* — Christopher Brown
(74) *Attorney, Agent, or Firm* — LeClairRyan, a Professional Corporation

(57) ABSTRACT

Apparatuses, methods, and non-transitory computer readable medium that evaluate a source code scanner are described. In one implementation, the method comprises obtaining source code. One or more good code snippets and one or more bad code snippets are inserted into the source code to obtain a modified source code. An issue list generated by the source code scanner upon scanning the modified source code is obtained. The issue list comprises code segments having security defects identified by the source code scanner, reasons for the security defects, and locations of the security defects in the modified source code. The code segments present in the issue list are compared with the one or more good code snippets and the one or more bad code snippets. A plurality of metrics, indicating quality of the source code scanner, are generated based on the comparison.

18 Claims, 3 Drawing Sheets

SYSTEMS AND METHODS FOR EVALUATING A SOURCE CODE SCANNER

FIELD OF INVENTION

This technology is related, in general to a source code scanner and, in particular, but not exclusively to apparatuses, methods, and non-transitory computer readable medium that evaluate a source code scanner.

BACKGROUND

Generally, most of audit standards, such as Payment Card Industry-Data Security Standards (PCI-DSS), Health Insurance Portability and Accountability Act (HIPPA), and Gramm-Leach-Bliley Act (GLBA) ask for source code auditing. A source code audit is typically carried out using a source code scanner to identify irregularities or security defects in source codes. In industry, the source code scanners are also referred to as source code analyzers or source code scanning tools. A code segment in a source code may be functionally correct, yet it may be written in a way that the code easily allows security attackers to break-in. Therefore, code authors have a combined responsibility to both write functionally correct code and code that is relatively harder, if not impossible, to break-in by a malicious attacker. While the issue of functional correctness of the code has been much addressed in software testing industry, the issue of secure coding correctness is relatively new The source code scanning tools scan the source code and identify irregularities present in the source code. In an example, the source code scanners may look for the irregularities such as, misuse of code constructs that easily allows the code to break or fail, design flaws within the source code, absence of logical organization in the source code, missing generics, errors in conditional logic, and issues that come up during execution of the source code. A wide variety of security code defects are known in industry, and standards bodies have reported top-10 or top-35 types of defects list. Source code scanners benchmark themselves by being able to detect known or well-documented source code security breaches. Nowadays, a wide range of the source code scanners are available in market. Therefore, organizations may find it difficult to select a source code scanner that meet requirements of their project, and identify irregularities in the source code accurately.

SUMMARY

Disclosed herein are apparatuses or other systems, methods, and non-transitory computer readable medium that evaluate source code scanners. In one example, the apparatus, for evaluating source code a scanner, comprises a processor, a memory communicatively coupled to the processor, wherein the memory stores processor-executable instructions, which, on execution, cause the processor to obtain source code. One or more good code snippets and one or more bad code snippets are inserted into the source code to obtain a modified source code. An issue list generated by the source code scanner upon scanning the modified source code is obtained. The issue list comprises code segments having security defects identified by the source code scanner, reasons for the security defects, and locations of the security defects in the modified source code. The code segments, present in the issue list, are compared with the one or more good code snippets and the one or more bad code snippets. A plurality of metrics, indicating quality of the source code scanner, are generated based on the comparison.

In an aspect of the invention, the method for evaluating a source code scanner comprises obtaining source code. One or more good code snippets and one or more bad code snippets are inserted into the source code to obtain a modified source code. An issue list generated by the source code scanner upon scanning the modified source code is obtained. The issue list comprises code segments having security defects identified by the source code scanner, reasons for the security defects, and locations of the security defects in the modified source code. The code segments, present in the issue list, are compared with the one or more good code snippets and the one or more bad code snippets. A plurality of metrics, indicating quality of the source code scanner, are generated based on the comparison.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
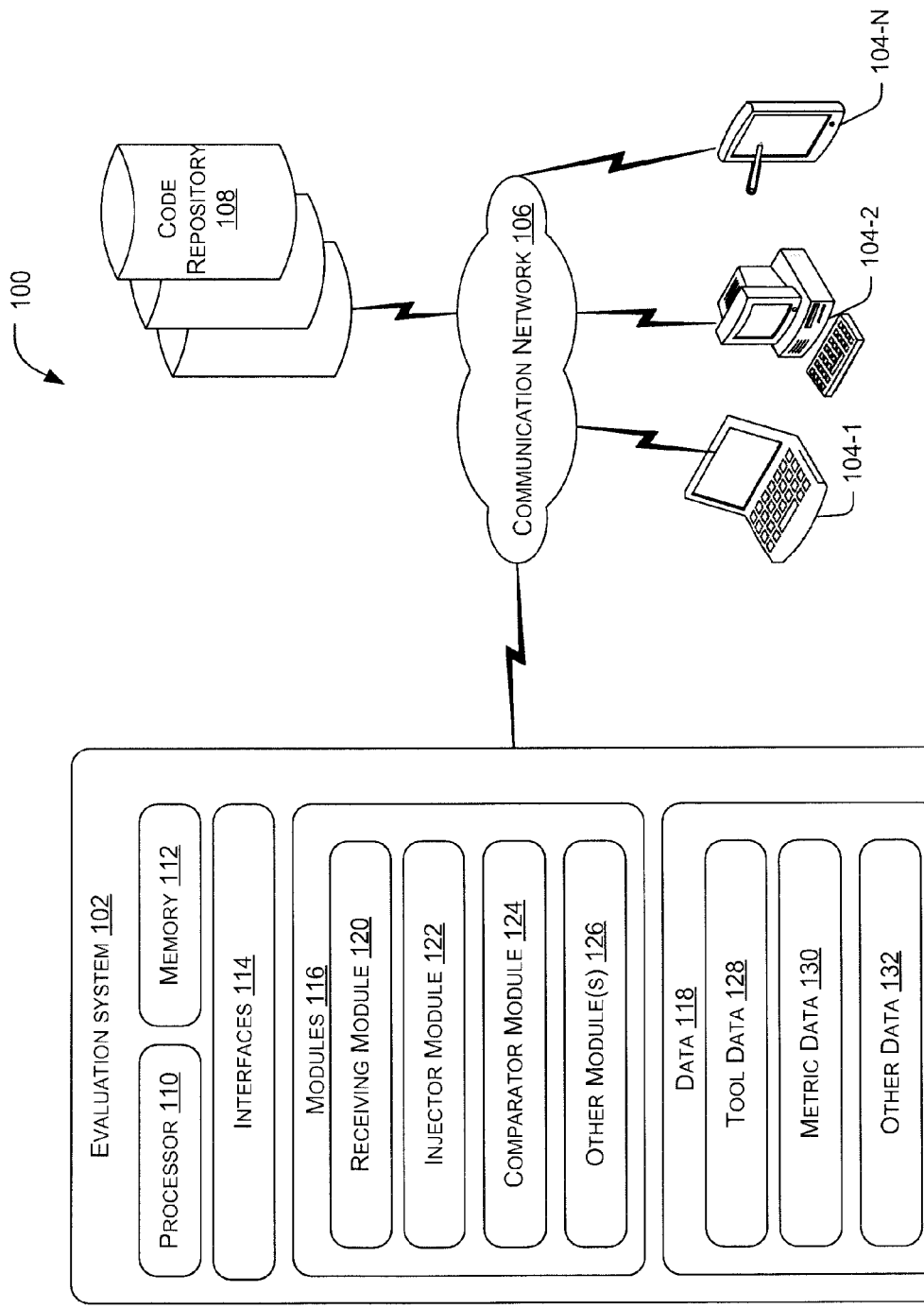
FIG. 1 is a diagram of an example of a network environment implementing an evaluation computing apparatus that evaluates a source code scanner, according to an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Systems and methods for evaluating a source code scanner are described herein. The systems and methods may be implemented in a variety of computing systems. The computing systems that can implement the described method(s) include, but are not limited to a server, a desktop personal computer, a notebook or a portable computer, and a mainframe computer. Although the description herein is with reference to certain computing systems, the systems and methods may be implemented in other computing systems, albeit with a few variations, as will be understood by a person skilled in the art.

For a source code audit, organizations may employ a source code scanner to determine quality of a source code and identify irregularities present in the source code. The source code scanner generally scans a source code of a project and generates an issue list having all the irregularities identified in the source code. Thereafter, a security analyst may go through the issue list obtained from the source code scanner to determine which issues are legitimate and which ones are false positive. The security analyst may be a person involved in the source code auditing and/or writing of the source code.

One of the challenges of source code analysis, using the source code scanners, is occurrence of the false positives and false negatives. In an example, depending on the source code scanner used and a particular instance of the source code, there may be a large number of false positives and false negatives. Each of the false positives costs resources, time, and money to analyze and delineate as a false alarm. Likewise, each one of the false negatives indicate legitimate security issue that the detected issues list failed to recognize, and therefore, kept the code system unprotected. Also, the false positives create an impression that the source code scanner used is not efficient and raise credibility issues in source code scanning process. Likewise, false negatives may create the impression that the source code scanner is not sufficiently protective.

Further, since a wide range of source code scanners are available in industry, an organization may select a source code scanner based on certain factors, such as information provided in marketing flyers and brochure, case study performed on a target code, third party recommendation. Such factors, considered for selecting the source code scanner, are not reliable as one cannot predict how the source code scanner will work for a particular project of importance or relevance for the stakeholders and furthermore a vendor may provide inflated figures about accuracy of the source code scanner in the brochure.

The present subject matter discloses examples of apparatuses or other systems, methods, and non-transitory computer readable medium that evaluate a source code scanner. The present subject matter evaluates the source code scanner and generates a plurality of metrics comprising false positive rates and false negative rates of the source code scanner. Based on the plurality of metrics, stakeholders, such as security analysts, developers, and audit specialists can select the source code scanner, for source code analysis, that best suits their project requirements.

In one implementation, to evaluate quality of the source code scanner, a source code is obtained. In one example, the source code may be obtained from a code repository. In another example, the source code may be obtained from a user device through which a user can input the source code. Subsequently, data flow and control flow of the source code may be determined. Once the data flow and the control flow of the source code are obtained, one or more good code snippets and one or more bad code snippets may be inserted into the source code, and a modified source code is obtained. In an example, the good codes snippets and the bad code snippets may be inserted into the source code based on the data flow and the control flow of the source code. In another example, the good code snippets and the bad code snippets may be randomly inserted into the source code to obtain a modified source code. It may be noted that instead of obtaining the source code, a particular instance of the source code may be obtained, and thereafter the good code snippets and the bad code snippets may be inserted into that particular instance of the source code.

The good code snippets may include exemplary and text book quality code segments that are free from irregularities or security defects. The bad codes may include malicious code segments that have irregularities in it as specified by industry standards. In other words, the bad code snippets are code segments that have security defects. In an example, the security defects may be one of design flaws within the source code, usage of code constructs known to be vulnerable to attacks, absence of logical organization in the source code, missing generics, errors in conditional logic, and issues that come up during execution of the source code. Further, the good code snippets and the bad code snippets may be obtained from a code library having examples of good codes and bad codes.

In one implementation, the good code snippets and the bad code snippets may be inserted into the source code through an insertion technique. The insertion technique may include at least one of a random injection, a dynamic path injection, or a critical component based injection. It may be noted that apart from listed insertion techniques, other techniques may also be used independently or in combination to obtain the modified source code without deviating from scope of the present subject matter.

Thereafter, the modified source code, having the good code snippets and the bad code snippets along with the original source code, is sent to a source code scanner for scanning Upon receiving the modified source code, the source code scanner may scan the modified source code and generate an issue list. The issue list may comprise code segments having security defects identified by the source code scanner, along with reasons and explanations for the respective security defects, and location of the security defects in the modified source code. In an example, the modified source code may be scanned by more than one source code scanner and each source code scanner may generate a separate issue list.

Subsequently, the code segments, present in the issue list, may be obtained and compared with the good code snippets and the bad code snippets. In an example, the location of the security defects, i.e., line number at which the security defects are identified may be compared with line numbers at which the good code snippets and the bad code snippets were inserted. Based on the comparison, false positives and false negatives are determined. A false positive may be understood as a case when a code segment, that doesn't have any security defects, is wrongly identified as malicious by the source code scanner and is present in the issue list. A false negative may be understood as a case when a code segment, that has security defects, is not present in the issue list generated by the source code scanner. Further, the false positives and the false negatives may be used for determining a false positive rate and a false negative rate of the source code scanner, which in turn can produce a list of metrics for evaluation and assessment.

In one implementation, two source code scanners may be evaluated by obtaining the code segments from issue lists generated by them. For example, the code segments may be obtained from a first issue list generated by a first source code scanner and a second issue list generated by a second source scanner. Upon comparing the code segments, if it is identified that false positives and false negatives of the first source code scanner are less than the respective false positives and false negatives of the second source code scanner, then it may be ascertained that the first source scanner has better quality than the second source scanner. Then, an organization may use the first source code scanner for scanning of source codes.

In the above example, if both the false positive count and false negative counts are lower for one scanner (A) than the other scanner (B), then the preference of scanner A over scanner B seems obvious. However, more complicated situations may arise when scanner A has lower false positive count but higher false negative count (or, vice versa) compared to those metrics of scanner B. In such cases, a cost or weight is assigned for false negatives over false positives to make a complete comparative evaluation.

In one implementation, by comparing the code segments received from the issue lists, a plurality of metrics may be generated. The plurality of metrics may comprise the false positive rate and the false negative rate to indicate quality of the source code scanner. Thereafter, quality of the source code scanners may be evaluated based on the plurality of metrics.

Thus, the present subject matter allows evaluation of the source code scanner and provides the plurality of metrics indicating the false positive rate and the false negative rate. Further, the present subject matter uses code injection techniques that insert the good code snippets and the bad code snippets randomly or strategically.

Figure 2:
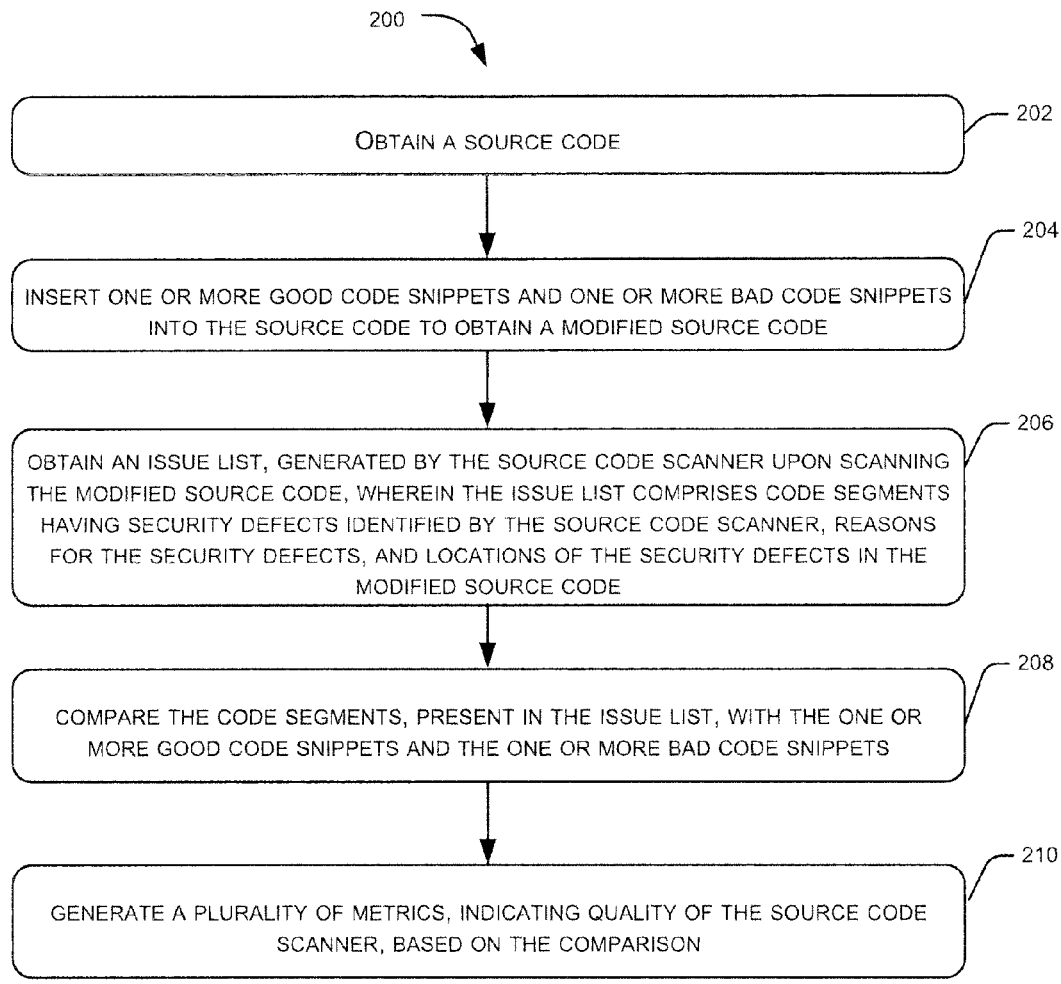
FIG. 2 is a flowchart of an example of a method for evaluating a source code scanner, according to an embodiment of the present subject matter.
Figure 3:
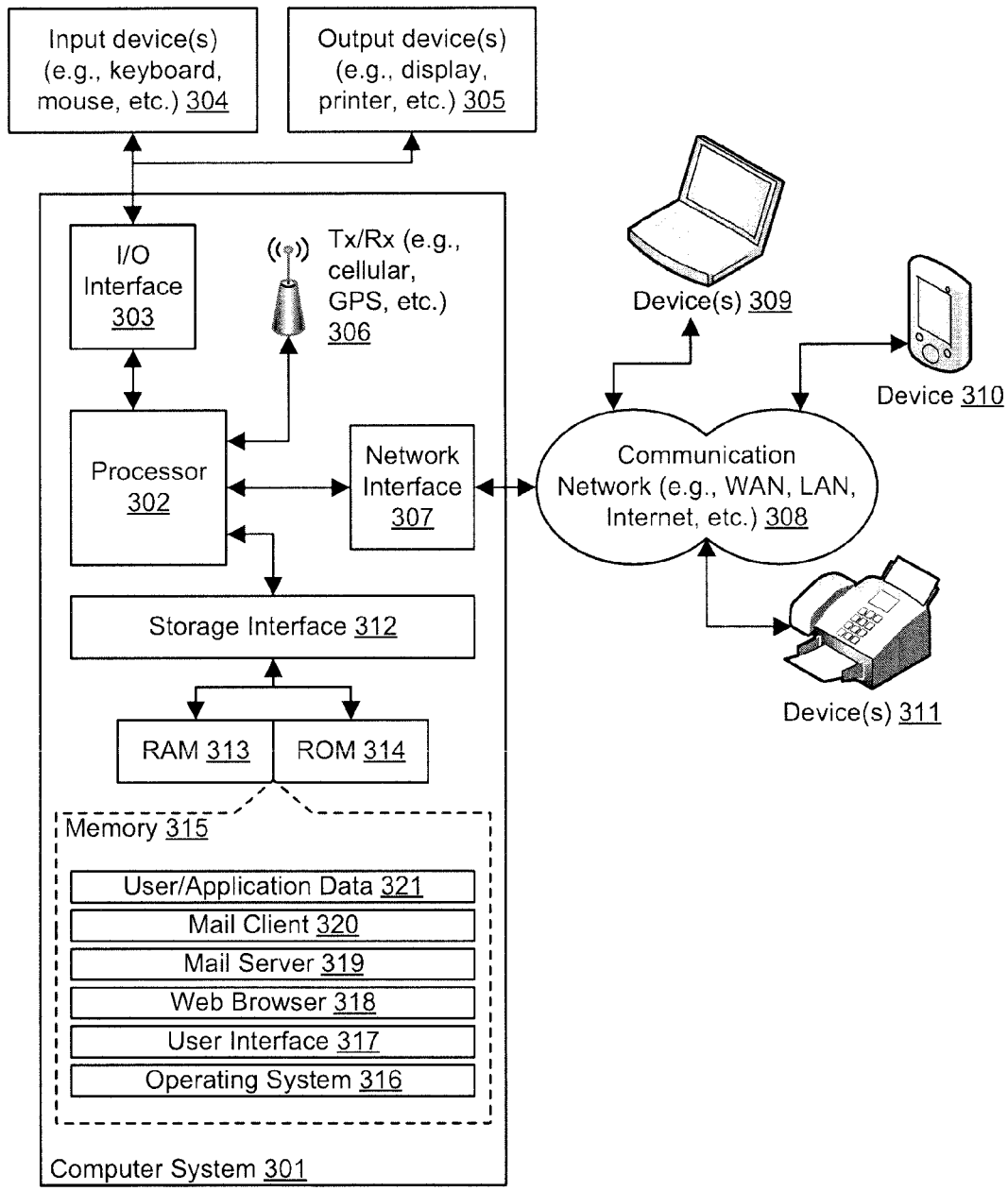
FIG. 3 is a block diagram of an exemplary computer apparatus that implements embodiments consistent with the present disclosure.

The working of the systems and methods for evaluating a source code scanner is described in greater detail in conjunction with FIGS. 1-3. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates a network environment 100 implementing an evaluation system 102 for evaluating a source code scanner, according to an embodiment of the present subject matter. Hereinafter, the evaluation system 102 may also be referred to as an evaluation computing apparatus or system 102.

The system 102 may be implemented in a variety of computing systems, such as a laptop computer, a desktop computer, a notebook, a workstation, a mainframe computer, a server, a network server, and the like. It will be understood that the system 102 may be accessed by users through a plurality of devices 104-1, 104-2, 104-3, 104-N, collectively referred to as devices 104 and individually referred to as device 104. Examples of the devices 104 include, but are not limited to, a desktop computer, a portable computer, a mobile phone, a handheld device, a workstation. The devices 104 may be used by various stakeholders or end users of the organization, such as project managers, code security analysts, and developers. In one implementation, the plurality of devices 104 may have source code scanners installed in them. The source code scanners are also referred to as source code analyzers and source code scanning tool. As shown in the figure, such devices 104 are communicatively coupled to the system 102 through a network 106 for facilitating one or more end users to access and/or operate the system 102.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices, etc.

As shown in FIG. 1, the network environment 100 further comprises a code repository 108. The code repository 108 includes examples of good codes and bad codes. The good codes may be understood as code segments that are free from security defects. The bad codes may be understood as code segments that have security defects present in them. Although, in FIG. 1, the code repository 108 has been shown external to the system 102, it may be noted that the code repository 108 can also be present within the system 102.

In one implementation, the system 102 includes a processor 110, a memory 112 coupled to the processor 110, and interfaces 114. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions stored in the memory 112. The memory 112 can include any non-transitory computer-readable medium known in the art including, for example, volatile memory (e.g., RAM), and/or non-volatile memory (e.g., EPROM, flash memory, etc.).

The interface(s) 114 may include a variety of software and hardware interfaces, for example, a web interface, a graphical user interface, etc., allowing the system 102 to interact with the devices 104. Further, the interface(s) 114 may enable the system 102 respectively to communicate with other computing devices. The interface(s) 114 can facilitate multiple communications within a wide variety of networks and protocol types, including wired networks, for example LAN, cable, etc., and wireless networks such as WLAN, cellular, or satellite. The interface(s) 114 may include one or more ports for connecting a number of devices to each other or to another server.

In one example, the system 102 includes modules 116 and data 118. In one embodiment, the modules 116 and the data 118 may be stored within the memory 112. In one example, the modules 116, amongst other things, include routines, programs, objects, components, and data structures, which perform particular tasks or implement particular abstract data types. The modules 116 and may also be implemented as, signal processor(s), state machine(s), logic circuitries, and/or any other device or component that manipulate signals based on operational instructions. Further, the modules 116 can be implemented by one or more hardware components, by computer-readable instructions executed by a processing unit, or by a combination thereof.

In one implementation, the modules 116 further include a receiving module 120, an injector module 122, a comparator module 124, and other modules 126. The other modules 126 may perform various miscellaneous functionalities of the system 102. It will be appreciated that such aforementioned modules may be represented as a single module or a combination of different modules.

In one example, the data 118 serves, amongst other things, as a repository for storing data fetched, processed, received and generated by one or more of the modules 116. In one implementation, the data 118 may include, for example, tool data 128, metric data 130, and other data 132. In one embodiment, the data 116 may be stored in the memory 112 in the form of various data structures. Additionally, the aforementioned data can be organized using data models, such as relational or hierarchical data models. The other data 132 may be used to store data, including temporary data and temporary files, generated by the modules 116 for performing the various functions of the system 102.

In operation, the receiving module 120 obtains a source code pertaining to a project. The source code may be understood as a collection of lines of code written for a software application. In one implementation, instead of receiving the entire source code, the receiving module 120 may receive a particular instance of the source code. In one example, the receiving module 120 may receive the source code through the devices 104. In another example, the receiving module 120 may obtain the source code from the code repository 108. Further, the receiving module 120 may analyze the source code to obtain data flow and control flow of the source code. In an example, the receiving module 120 may use a data flow extractor and a control flow extractor for determining the data flow and the control flow of the source code, respectively.

Once the data flow and the control flow of the source code are determined, the injector module 122 may insert one or more good code snippets and one or more bad code snippet into the source code. In an example, the injector module 122 may insert the good code snippets and the bad code snippets, based on the data flow and the control flow of the source code, to obtain a modified source code. In another example, the injector module 122 may insert the good code snippets and the bad code snippets randomly into the source code. Further, the good code snippets and the bad code snippets may be obtained from the code repository 108. The good codes may be exemplary and text book code segments that are free from any kind of irregularity or security defect. The bad codes are code segments that have known irregularities or security defects and have been specified as malicious code segments by industry standards. It may be noted that code segment atomicity should be maintained while obtaining random snippets of the good codes and the bad codes. A good code segment, comprising several (k) lines of code shall be inserted as an atomic object, and similar atomicity definition also applies for bad code segment.

Further, the injector module 122 may analyze the control flow the source code to determine areas of the source code that are executed when certain values are assigned to decision making path segments and to determine code sequencing paths that are fixed. In an example, the injector module 122 may use a dynamic path analyzer to determine the areas of the source code that are executed when certain values are assigned to the decision making path segments. For example, an 'IF' statement may be evaluated as a function of a variable value. Also, the injector module 122 may use a static path analyzer to determine the code sequencing path that are fixed, for example, looping structures, straight sequencing codes, 'IF' statements with a condition that is variable independent. The injector module 122 may use information related to dynamic path and static path of the source to strategically insert the good code snippets and the bad code snippets into the source code.

Post injection of the one or more good code snippets and/or one or more bad code snippets, the modified code, comprising the source code, the good code snippets and bad code snippets, may not be executed. The modified source code is subject to the scanner for static analysis. Depending upon the scanner, the injector module 122 may analyze the modified code for dynamic path based path traversal as well, but this is not same as executing the modified code.

In one implementation, at least one of a random injection, a dynamic path injection, or a critical component based injection may be used for inserting the good code snippets and the bad code snippets.

In the random injection, the injector module 122 inserts the good code snippets and the bad code snippets uniformly spread across the source code. The injector module 122 may consider the good code snippets and the bad code snippets as atomic code segment pieces, so that original code continuity is maintained from the source code's perspective and the snippets' perspective as well.

In the dynamic path injection, the injector module 122 may insert the good code snippets and the bad code snippets into areas of the source code that may fall within a conditional statement; and traversal and execution of the source code depends on evaluation of certain run-time variables. For example, if there is an 'IF' statement putting a condition that if 'k=5', then a certain code area will be traversed and executed. In such cases, the injector module 122 may artificially set the value of k=5, and populate that code area with snippets of the good codes and the bad codes assuming that the certain code area will be executed.

In the critical component based injection, the injector module 122 injects the good code snippets and the bad code snippets into specific areas of the source code. The specific areas may be selected based upon code factors, such as criticality of certain functions, sensitivity of origin of the source code, and priority assigned to certain areas of the source code. Example usage of critical component based injection may include, but not be limited to, code security evaluation of a particular vendor provided code, evaluation of a particular developer's secure code writing skills, evaluation of a group or team in secure code writing skills, cross evaluation of different teams or providers or vendors in secure code development skill, and risk containment of sensitive code segments or modules.

Subsequently, the injector module 122 may augment the source code with the snippets of good codes and the bad codes to obtain a combined logic in the modified code. In an example, the injector module 122 uses a code augmenter to obtain the combined logic that joins the source code with the snippets of the good codes and the bad codes. The injector module 122 may simply append two files; first one with the source code and second one with the snippets of the good codes and the bad codes to obtain the combined logic in the modified source code.

Thereafter, the comparator module 124 may send the modified source code to the source code scanner. The source code scanner may scan and analyze the modified the source code in a conventional manner to determine malicious code segments that are present in the modified source code. Subsequently, the source code scanner may generate an issue list having details, such as code segments that have security defects identified by the source code scanner, reasons for flagging the respective code segments as potential security defects, priority assigned to the security defects, and location of the security defects in the modified source code. It may be noted that modified code is not executed by the source code scanners. Wherever, the good code snippets and the bad code snippets are inserted after a conditional statement, the source code scanner assumes the conditional statement as 'true' and scans the good code snippets and/or the bad code snippets inserted after the conditional statement.

Once the issue list is generated by the source code scanner, the comparator module 124 may obtain the code segments from the issue lists that are identified as malicious code segments. Then, the comparator module 124 may compare the code segments with the good code snippets and the bad code snippets to determine false positives and false negatives. In an example, the comparator module 124 may compare line number of the code segments and line number where the good code snippets and the bad code snippets were inserted into the source code to determine whether the source code scanners has correctly identified all the bad code snippets and there is no good snippets present in the issue list.

Subsequently, the comparator module 124 may generate a plurality of metrics, indicating quality of the source code scanners. In an example, the plurality of metrics may include a false positive rate and a false negative rate of the source code scanner. Further, the plurality of metric may be stored in the metric data 130 within the system 102 for further use.

In one implementation, where quality of more than source code scanner is to be evaluated, the comparator module 124 may retrieve a list of source code scanners, from the tool data 128, which are available for evaluation. Based on the list, the comparator module 124 may send the modified source code to the source code scanners for scanning. Then the source code scanners may scan the modified source code to determine code segments that have security defects. Each of the source code scanners may generate an issue list having such code segments. Subsequently, the comparator module 124 may compare the code segments, received from the issue lists, with the good code snippets and the bad code snippets to determine false positives and false negatives of the source code scanners. Thereafter, based on the false positives and the false negatives, a false negative rate and a false negative rate for each of the source code scanner may be determined.

In an example if 100 good code snippets were injected into the source code and 3 of the 100 good code snippets are mistakenly flagged as malicious code and present in an issue list generated by a first source code scanner, then it may be determined that the first source code scanner has a false positive rate of 3 percent. Similarly, if 5 of the 100 good snippets are present in an issue list generated by a second source code scanner, then it may be determined that the second source scanner has a false positive rate of 5 percent. Generally, the source code scanners with a low false positive rate are preferred. In another example, if 100 bad code snippets were injected into the source code and 10 of the 100 bad code snippets are not present in the issue list, then it may be determined that the source code scanner has a false negative rate of 10 percent. Note that the list of bad code snippets, that are not present in the issue list but should have been there, can be generated by a comparison of what is injected vis-à-vis what is detected. Ideally, injected bad code list should be all detected, but in practice they may not all be detected and the delta between the injected code segments and detected code segments may causes the false negative determination. Generally, the source code scanners with a low false negative rate are preferred. Further, based on such plurality of metrics, quality of the source code scanners may be evaluated.

In this manner, the system 102 evaluates quality of the source code scanners and generate the plurality of metrics, thereby, allowing stakeholders to take business decision, for example, which source code scanner to be used for a particular project. The system 102 makes use of the data flow and the control flow of the source to strategically insert the snippets of the good codes and the bad codes, which helps in improving accuracy of the evaluation.

Further, it may be noted that functionalities of the system 102 may be assigned to the source code scanner through a plug-in code so that the source code scanner can perform the functionalities of the system 102. In such cases, the source code scanner may evaluate itself.

FIG. 2 illustrates exemplary computer implemented methods for evaluating a source code scanner, according to an embodiment of the present subject matter.

The methods 200 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 are described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to method 200 as depicted in FIG. 2, as shown in block 202, a source code is obtained. The source code may be understood as lines of codes written in one or more programming languages. In one example, the source code may be Java code combined with scripts and assembly within. The source code may be obtained from the code repository 108 of through the devices 104. In an example, the receiving module 120 may obtain a particular instance of the source code instead of obtaining complete source code of a project.

At block 204, one or more of good code snippets and one or more bad code snippets are inserted into the source code to obtain a modified source code. Hence, the modified code comprises line of codes present in the source codes, the one or more good code snippets, and the one or more bad code snippets. In an example, the good code snippets and the bad code snippets may be obtained from the code repository 108. The good code snippets may be understood as code segments that are free from security defects. Whereas, the bad code snippets are code segments that have security defects.

In an example, before inserting the good code snippets and the bad code snippets, at least one of data flow or control flow of the source code may be determined. Thereafter, the injector module 122 may insert the good code snippets and the bad code snippets based on the at least one of data flow and the control flow. In another example, the injector module 122 may randomly insert the good code snippets and the bad code snippets into the source code.

At block 206, an issue list, generated by the source code scanner upon scanning the modified source code, is obtained. The issue list may comprise code segments having security defects identified by the source code scanner, reasons for the security defects, and locations of the security defects in the modified source code.

At block 208, the code segments, present in the issue list, are compared with the one or more good code snippets and the one or more bad code snippets. In an example, the comparator module 124 may retrieve line number of the code segments that are present in the issue list. Then, the comparator module 124 may compare the line number with line numbers where the good code snippets and the bad code snippets were inserted. Based on the comparison, the comparator module 124 may determine false positives and false negatives present in the issue list.

At block 210, a plurality of metrics, indicating quality of the source code scanner, is generated based on the comparison. Based on the plurality of metrics, quality of the source code scanner is evaluated. The plurality of metrics may comprise a false positive rate and a false negative rate of the source code scanner. Generally, a source code scanner with a lower false positive rate and a lower false negative rate is preferred over a source code scanner with a higher false positive rate and a higher false negative rate. It may be understood that the comparator may also generate similar metrics providing insights to evaluate the source code scanners.

Computer System

FIG. 3 is a block diagram of an exemplary computer system for implementing embodiments consistent with the present disclosure. Variations of computer system 301 may be used for implementing any of the devices presented in this disclosure. Computer system 301 may comprise a central processing unit ("CPU" or "processor") 302. Processor 302 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 318-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, and 312. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol); secure sockets layer (SSL), Transport Layer Security (TLS), etc. Web browsers may utilize facilities such as AJAX, DHTML, Adobe Flash, JavaScript, Java; application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described methods and systems for evaluating source code scanners. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for evaluating a source code scanner, the method comprising:
   determining, by a code evaluation computing device, control flow and data flow in source code;
   inserting, by the code evaluation computing device, one or more exemplary code snippets or one or more irregular code snippets into one or more areas in the source code comprising one or more critical functional areas in the source code to produce modified source code, wherein the one or more critical functional areas in the source code are based on the determined control flow and data flow;
   sending, by the code evaluation computing device, the modified source code to a source code scanner for analysis;
   obtaining, by the code evaluation computing device, an issue list, generated by the source code scanner after the source code scanner has analyzed the modified source code, wherein the issue list comprises code segments comprising security defects identified by the source code scanner, reasons for the security defects, and locations of the security defects in the modified source code;
   comparing, by the code evaluation computing device, the code segments in the issue list to the one or more exemplary code snippets or the one or more irregular code snippets; and
   generating, by the code evaluation computing device, a plurality of metrics, indicating quality of the source code scanner, based on the comparison.

2. The method of claim 1, wherein the one or more exemplary code snippets do not comprise security defects or the one or more irregular code snippets comprise one or more security defects.

3. The method of claim 1, further comprising:
   inserting, by the code evaluation computing device, at least one of the one or more exemplary code snippets or at least one of the one or more irregular code snippets into the source code based on the determined control flow and data flow of the source code.

4. The method of claim 1, wherein the further comprising:
   inserting, by the code evaluation computing device, at least one of the one or more exemplary code snippets or at least one of the one or more irregular code snippets into random locations in the source code.

5. The method of claim 1, wherein the plurality of metrics for the source code scanner comprises a false positive rate or a false negative rate.

6. The method of claim 1, wherein the inserting further comprises:
   determining, by the code evaluation computing device, when one or more areas in the source code comprise an evaluation of run-time variables; and
   inserting, by the code evaluation computing device, at least one of the one or more exemplary code snippets or at least one of the one or more irregular code snippets into the areas in the source code when the source code is determined to comprise an evaluation of run-time variables.

7. An evaluation computing apparatus comprising:
   a processor; and
   a memory coupled to the processor which is configured to be capable of programmed instructions, which comprise the programmed instructions stored in the memory to:
      determine control flow and data flow in source code;
      insert one or more exemplary code snippets or one or more irregular code snippets into one or more areas in the source code comprising one or more critical functional areas in the source code to produce modified source code, wherein the one or more critical functional areas in the source code are based on the determined control flow and data flow;
      send the modified source code to a source code scanner for analysis;
      obtain an issue list, generated by the source code scanner after the source code scanner has analyzed the modified source code, wherein the issue list comprises code segments comprising security defects identified by the source code scanner, reasons for the security defects, and locations of the security defects in the modified source code;
      compare the code segments in the issue list to the one or more exemplary code snippets or the one or more irregular code snippets; and
      generate a plurality of metrics, indicating quality of the source code scanner, based on the comparison.

8. The apparatus according to claim 7, wherein the one or more exemplary code snippets do not comprise security defects or the one or more irregular code snippets comprise one or more security defects.

9. The apparatus according to claim 7, wherein the processor is further configured to be capable of executing programmed instructions, which comprise the programmed instructions stored in the memory to:
   insert at least one of the one or more exemplary code snippets or at least one of the one or more irregular code snippets into the source code based on the control flow and data flow of the source code.

10. The apparatus according to claim 7, wherein the configured to be capable of executing programmed instructions for the inserting, which comprise the programmed instructions stored in the memory to:
    insert at least one of the one or more exemplary code snippets or at least one of the one or more irregular code snippets into random locations in the source code.

11. The apparatus according to claim 7, wherein the plurality of metrics for the source code scanner comprises a false positive rate or a false negative rate.

12. The device of claim 7, wherein the processor is further configured to be capable of executing programmed instructions for the inserting, which comprise the programmed instructions stored in the memory to:
    determine when one or more areas in the source code comprise an evaluation of run-time variables; and
    insert at least one of the one or more exemplary code snippets or at least one of the one or more irregular code snippets into the areas in the source code when the source code is determined to comprise an evaluation of run-time variables.

13. A non-transitory computer-readable medium having stored thereon instructions for evaluating a source code scanner comprising machine executable instructions which when executed by at least one processor, causes the processor to perform steps comprising:
    determining data flow and control flow in source code;
    inserting one or more exemplary code snippets or one or more irregular code snippets into one or more areas in the source code comprising one or more critical functional areas in the source code to produce a modified source code, wherein the one or more critical functional areas in the source code are based on the determined control flow and data flow;
    sending the modified source code to a source code scanner for analysis;
    obtaining an issue list, generated by the source code scanner after the source code scanner has analyzed the modified source code, wherein the issue list comprises code segments comprising security defects identified by the source code scanner, reasons for the security defects, and locations of the security defects in the modified source code;
    comparing the code segments in the issue list to the one or more exemplary code snippets or the one or more irregular code snippets; and
    generating a plurality of metrics, indicating quality of the source code scanner, based on the comparison.

14. The non-transitory computer-readable medium according to claim 13, wherein the one or more exemplary code snippets do not comprise security defects or the one or more irregular code snippets comprise one or more security defects.

15. The non-transitory computer-readable medium according to claim 13, further having stored thereon instructions that when executed by the processor cause the processor to perform steps further comprising:
    inserting at least one of the one or more exemplary code snippets or at least one of the one or more irregular code snippets into the source code based on the control flow and data flow of the source code.

16. The non-transitory computer-readable medium according to claim 13, further having stored thereon instructions that when executed by the processor cause the processor to perform steps further comprising:
    inserting at least one of the one or more exemplary code snippets or at least one of the one or more irregular code snippets into random locations in the source code.

17. The non-transitory computer-readable medium according to claim 13, wherein the plurality of metrics for the source code scanner comprises a false positive rate or a false negative rate.

18. The non-transitory computer-readable medium according to claim 13, further having stored thereon instructions for the inserting that when executed by the processor cause the processor to perform steps further comprising:
    determining when one or more areas in the source code comprise an evaluation of run-time variables; and inserting at least one of the one or more exemplary code snippets or at least one of the one or more irregular code snippets into the areas in the source code when the source code is determined to comprise an evaluation of run-time variables.

\* \* \* \* \*